United States Patent [19]

Caralli et al.

[11] Patent Number: 4,512,781
[45] Date of Patent: Apr. 23, 1985

[54] SHUTTLE VALVES AND SYSTEM FOR FLUID CONTROL

[75] Inventors: Michael J. Caralli, Irwin; Gary W. Friedline, New Alexandria, both of Pa.

[73] Assignee: Pittsburgh Brass Manufacturing Company, Irwin, Pa.

[21] Appl. No.: 551,146

[22] Filed: Nov. 14, 1983

[51] Int. Cl.³ .............................................. B01D 53/04
[52] U.S. Cl. .............................................. 55/26; 55/33; 55/163; 55/179; 55/387; 137/112; 251/26
[58] Field of Search .................... 55/33, 62, 161–163, 55/179, 180, 208, 387, 389, 26; 137/110, 112, 119; 251/26

[56] References Cited

U.S. PATENT DOCUMENTS

| 1,190,799 | 7/1916 | Rene | 251/26 X |
|---|---|---|---|
| 1,577,908 | 3/1926 | Hynes | 251/26 X |
| 2,206,957 | 7/1940 | Hose | 251/26 |
| 3,038,487 | 6/1962 | Gardner | 137/112 |
| 3,258,899 | 7/1966 | Coffin | 55/179 X |
| 3,294,106 | 12/1966 | Ludwig et al. | 137/110 |
| 3,323,292 | 6/1967 | Brown | 55/179 X |
| 3,324,631 | 6/1967 | Kreuter | 55/179 X |
| 3,338,257 | 8/1967 | Ferguson | 137/112 |
| 3,659,399 | 5/1972 | Kauer, Jr. et al. | 55/62 X |
| 3,923,479 | 12/1975 | Glass et al. | 55/163 |
| 4,162,146 | 7/1979 | Seibert | 55/179 X |
| 4,187,871 | 2/1980 | Hendrickson | 137/112 |
| 4,247,311 | 1/1981 | Seibert et al. | 55/387 X |
| 4,253,481 | 3/1981 | Sarlls, Jr. | 137/112 |
| 4,295,863 | 10/1981 | Lattuada | 55/62 X |
| 4,312,640 | 1/1982 | Verrando | 55/33 |
| 4,331,457 | 5/1982 | Morner | 55/179 X |

Primary Examiner—Robert Spitzer
Attorney, Agent, or Firm—Parmelee, Miller, Welsh & Kratz

[57] ABSTRACT

An apparatus system for drying gases to provide a reverse flow to and from a pair of absorbent beds is automatically solely controlled by a unitary inlet logic shuttle valve unit and by a unitary outlet logic shuttle valve unit. Each valve unit employs positive acting slide valve elements that operate in a smooth and effective manner.

17 Claims, 8 Drawing Figures

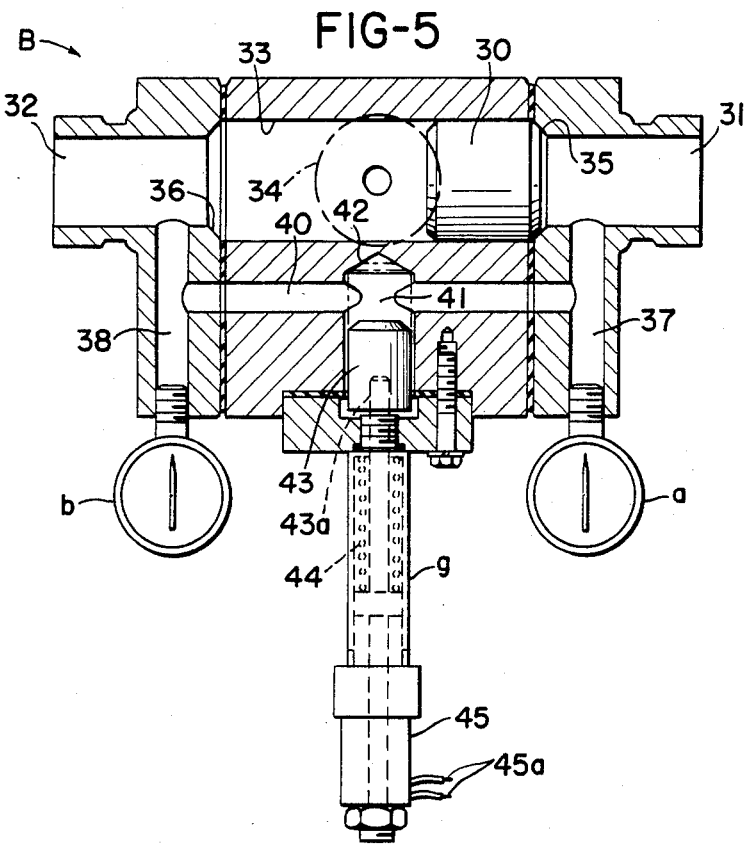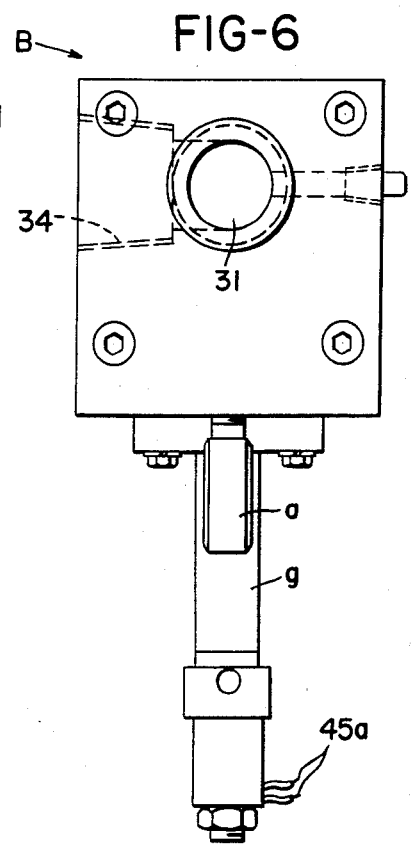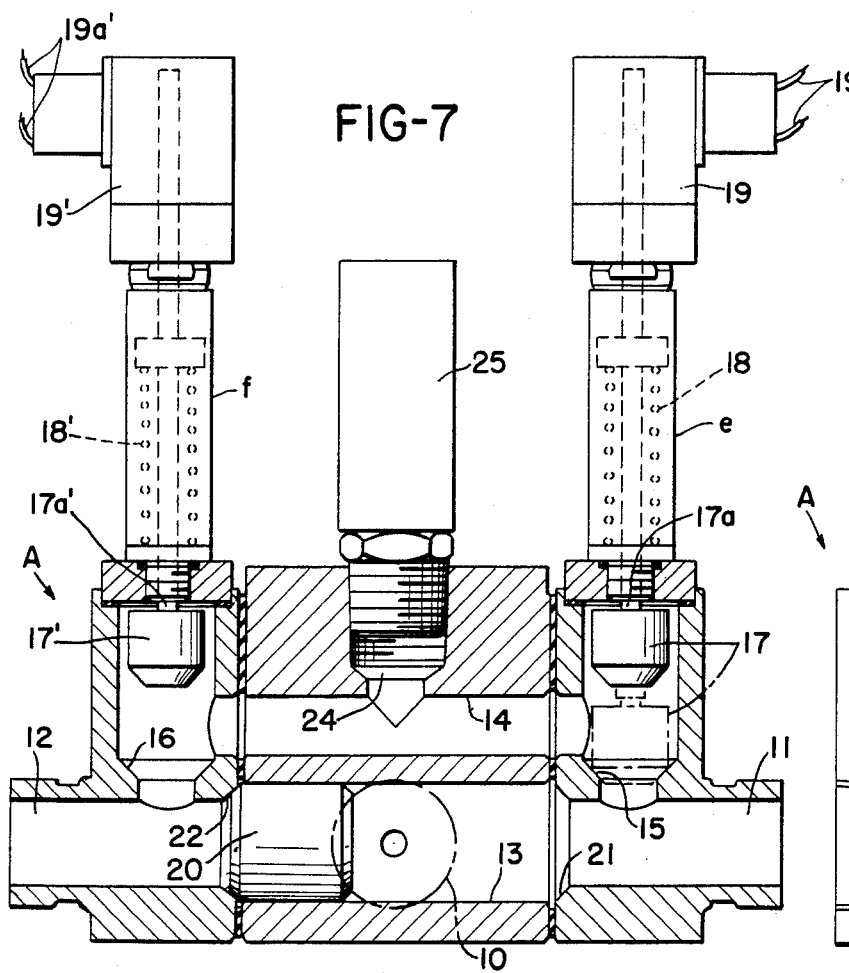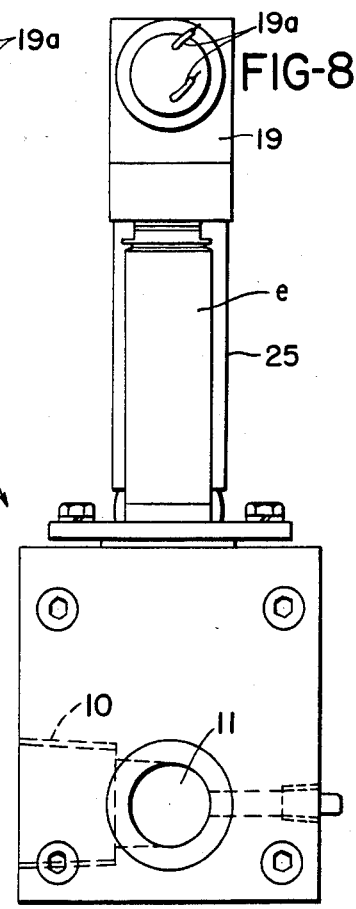

SHUTTLE VALVES AND SYSTEM FOR FLUID CONTROL

This invention pertains particularly to a system, method and apparatus for controlling flow of pressurized fluid therethrough and therefrom.

A phase of the invention pertains to an improved system, method or apparatus for enabling fluid (liquid, gas or air) flow in one direction through a fluid conditioner, such as an air drying tank, with a return flow of a portion of the conditioned fluid used to recondition material in a second tank, and with a sequential reverse flow through the tanks in such a manner as to provide a continuous fluid conditioning or drying operation.

Another phase of the invention relates to new and improved shuttle valve apparatus.

The present system and apparatus have been devised in view of problems heretofore presented in connection with the provision of a system and equipment for drying air within one tank while enabling a regeneration within a second tank and, vice versa, as accomplished by a reverse fluid pressure flow. Such a system has heretofor involved a complex arrangement of control filters, check valves, pressure regulators, control gauges, valves, actuators, relays, flow meters, etc.

Prior systems for such a purpose are thus not only expensive from the standpoint of equipment involved, but are also subject to operating problems by reason of the complexity of and the many different elements of equipment involved.

Although the present invention has been devised particularly to meet the problem thus presented by a two-part, simplified apparatus arrangement that has reduced costs immeasurably and simplified operation controls and factors involved in an air drying system, it should be recognized that the invention has a much broader scope from the standpoint of enabling an automatic, periodically reversed flow of pressurized fluid which is being conditioned in one side of the system, while the other side is being reconditioned, all in such a manner that a reverse operation can be automatically effected and in a positive, inexpensive and highly efficient manner.

It has thus been an object of the invention to devise an improved, positive, highly efficient and investment-saving system which will basically only require two shuttle valves for reversing flow of a fluid being introduced under pressure.

Another object has been to devise shuttle valve units and ones that may be effectively utilized in such a system as here involved and that will enable an automatic reversal of pressurized fluid flow therethrough in cooperation with each other.

A further object of the invention has been to devise a method and apparatus for shuttling fluid from one valve unit to another alternately through a pair of treatment units, while routing a portion of the fluid in a return path through one of the units in an alternate manner.

A still further object of the invention has been to devise new and improved shuttle valve units which may be utilized for controlling flow of pressurized fluid therethrough and with respect to each other in a cooperative manner.

These and other objects of the invention will appear to those skilled in the art from the illustrated embodiment and the claims.

In the drawings

FIG. 1. is a schematic operational showing of a representative system employing equipment and principles of the invention; in this view as well as in subsequent operational views represented as FIGS. 2 through 4, inclusive, upper and lower shuttle valve units are illustrated in section to indicate the operative positioning of their elements and a particular phase of a complete operational cycle.

FIGS. 2, 3 and 4 represent subsequent operational phases or states of the system which will be later discussed in more detail.

FIG. 5 is a vertical section through the top or upper shuttle valve unit employed in the operational system of FIGS. 1 through 4, with its pressure-sensitive slide valve element in a right-hand seated position within its main passageway, and with an auxiliary control valve element shown in full lines in a fully open position with respect to a by-pass passageway and by dot and dash lines in a substantially closed position.

FIG. 6 is a side view in elevation on the same scale as and of a shuttle valve unit of FIG. 5.

FIG. 7 is a vertical section through a lower shuttle valve unit employed in the system of FIGS. 1 through 4, in which its pressure-sensitive slide element is in a lefthand closed position within its main passageway, a left hand control valve element for an auxiliary by-pass passageway is in its fully open position, and a right hand control valve element is shown in solid lines in its fully open position and by dot and dash lines in its closed or valve seat closing-off position.

And, FIG. 8 is an end view in elevation on the same scale as and showing the valve unit of FIG. 7.

DETAILED DESCRIPTION

Figure 1:
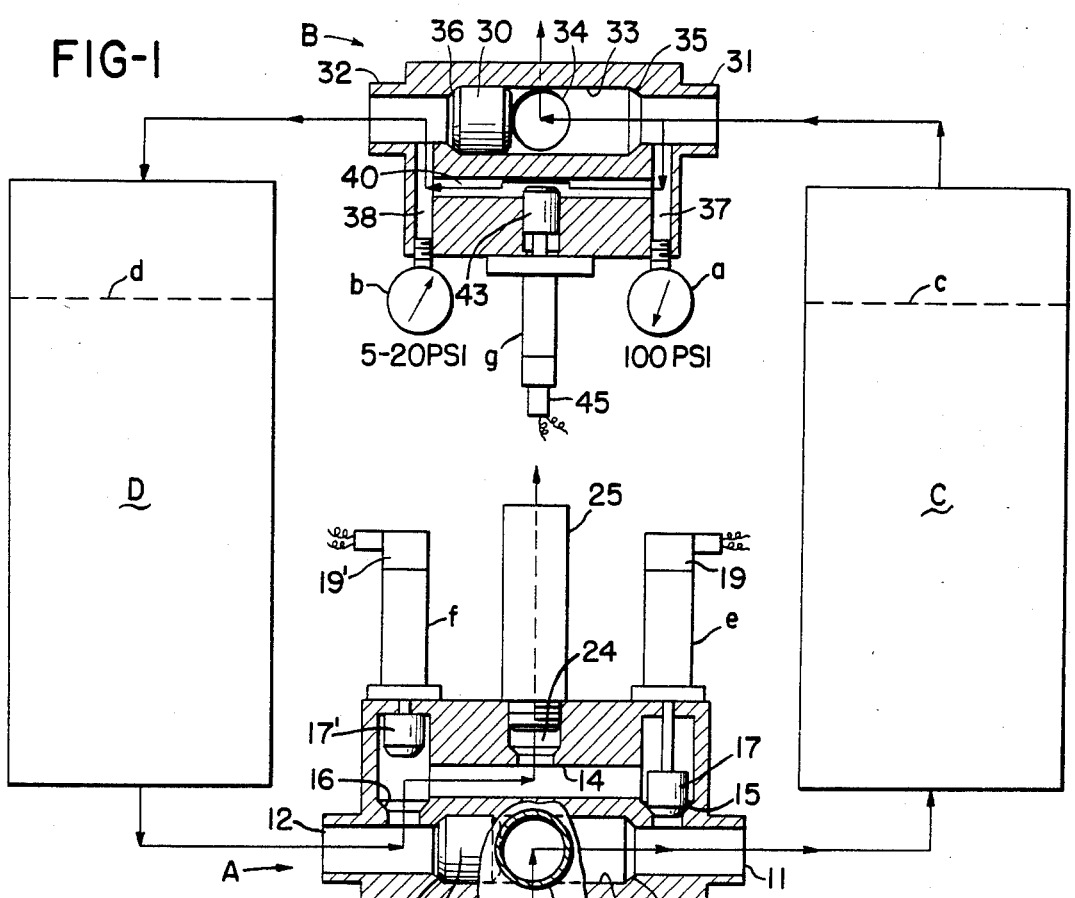

Since the two shuttle valves of FIGS. 5 through 8, inclusive, represent an important phase of the invention, they will be first described in detail as to their contruction and operation. Referring particularly to FIGS. 7 and 8, what may be termed the lower shuttle valve unit A of FIGS. 1 through 4, inclusive, has a somewhat horizontally or longitudinally extending housing which has a main side inlet 10 for pressurized fluid (liquid or gas, such as air) that is to be processed or conditioned. The inlet 10 is open to a main, longitudinal through passageway 13 which, at its opposite ends, has valve seats 21 and 22, and beyond such ends has right and left hand port portions 11 and 12 which alternately serve as outlets and inlets thereto. The port portion 11 has an upper by-pass port connected to an auxiliary, longitudinally extending by-pass passageway 14 which defines a valve seat for a vertical operating, control valve element 17. The control valve element 17 has an operating piston rod 17a which extends into a conventional operating unit e that is controlled by an electric coil or solenoid 19 having electric leads 19a for positively actuating the valve 17 to move it from its closed, dot and dash position of FIG. 7 to the full line open position shown. Although return movement of the element 17 may be effected also ay an electric solenoid, for simplicity, a tension spring 18 may be used for this purpose when the solenoid unit 19 is electrically de-energized.

The other or left hand end of the auxiliary passageway 14 terminates in a valve seat 16 that is open to the end port 12 and which has a control valve element 17' operatively carried therein. Elements 17a', 18', 19' and 19a' are elements corresponding to the same numerals described in connection with the valve element 17, while the f is an operating unit that corresponds to the unit e.

The auxiliary or by-pass passageway 14 has a centrally disposed, upwardly extending, exhaust port 24 within which a suitable exhaust element, such as a muffler 25, is threadably-removably mounted. From the construction thus shown as to the shuttle valve unit A, it will be apparent that the slide valve element 20 will move within the passageway 13 between the valve seats 21 and 22 at its opposite ends, depending upon the pressure differential exerted at the port ends 11 and 12.

Now referring to shuttle valve unit B of FIGS. 5 and 6, it also has a main valve operating passageway 33 extending longitudinally or horizontally therethrough, and having opposite inlet port end portions 31 and 32 adjacent opposed valve seats 35 and 36. A pressure-sensitive slide valve element 30 is operatively carried within the main passageway 33 to alternately close-off the seats 35 or 36 to thus change the direction of flow into a side outlet port 34. In accordance with the system layouts of FIGS. 1 and 4, the outlet 34 is adapted to receive conditioned pressured fluid from each of the tanks A and B and thereby discharge it.

The unit B also has an auxiliary or by-pass passageway 40 which also extends longitudinally of its housing and in a substantially parallel relation with the main passageway 33; it is connected to opposite ends of the main passageway 33 by transverse, by-pass passageways 37 and 38. To indicate representative pressures within the transverse by-pass passageways 37 and 38, pressure gauges a and b are mounted at their outer ends. Auxiliary or by-pass, cross-connecting passageway 40 has an enlarged, transverse valve-operating cross-bore or passageway 41 within which control valve element 43 is operatively positioned. The control valve unit 43 has a piston rod 43a that is connected to a conventional operating unit g. The unit g is a double-acting fluid-pressure-operated cylinder or it may, as shown, have a tension spring 44 tending to move it towards a closed position with respect to a seat 42, and an electrical solenoid unit 45 for controlling its forward and return movements, depending on the amount of electric current supplied thereto. Primarily, the valve 43 controls the amount of fluid flow along the passageway 40. Leads 45a carry electric current from a suitable control panel which may have motor driven, cam-operated switches to selectively control the energization of the leads 19a and 19a' and 45a in accordance with the operative procedure illustrated in FIGS. 1 through 4 of the drawings.

FIG. 1 shows an operative position of the lower and upper shuttle valve units A and B which provides a right-hand flow of a main fluid stream of pressured fluid through a processing tank C and therefrom for plant usage. A bleed-off of lesser or auxiliary flow from the main stream of the processed fluid is returned through a second processing tank D (for reconditioning its processing material) by way of the by-pass or auxiliary passageway 40 in the upper valve unit B. The auxiliary flow from the tank D is into the lower valve unit A for discharge through its auxiliary passageway 14 and muffler 25 to the atmosphere. The upper valve unit B is provided with control valve means 43 which operate to partially close by-pass or auxiliary passageway 40 to provide a return flow of lesser pressure, thus assuring a differential which may be from zero up to about 25% of the main input line pressure of fluid from the tank C.

Figure 2:
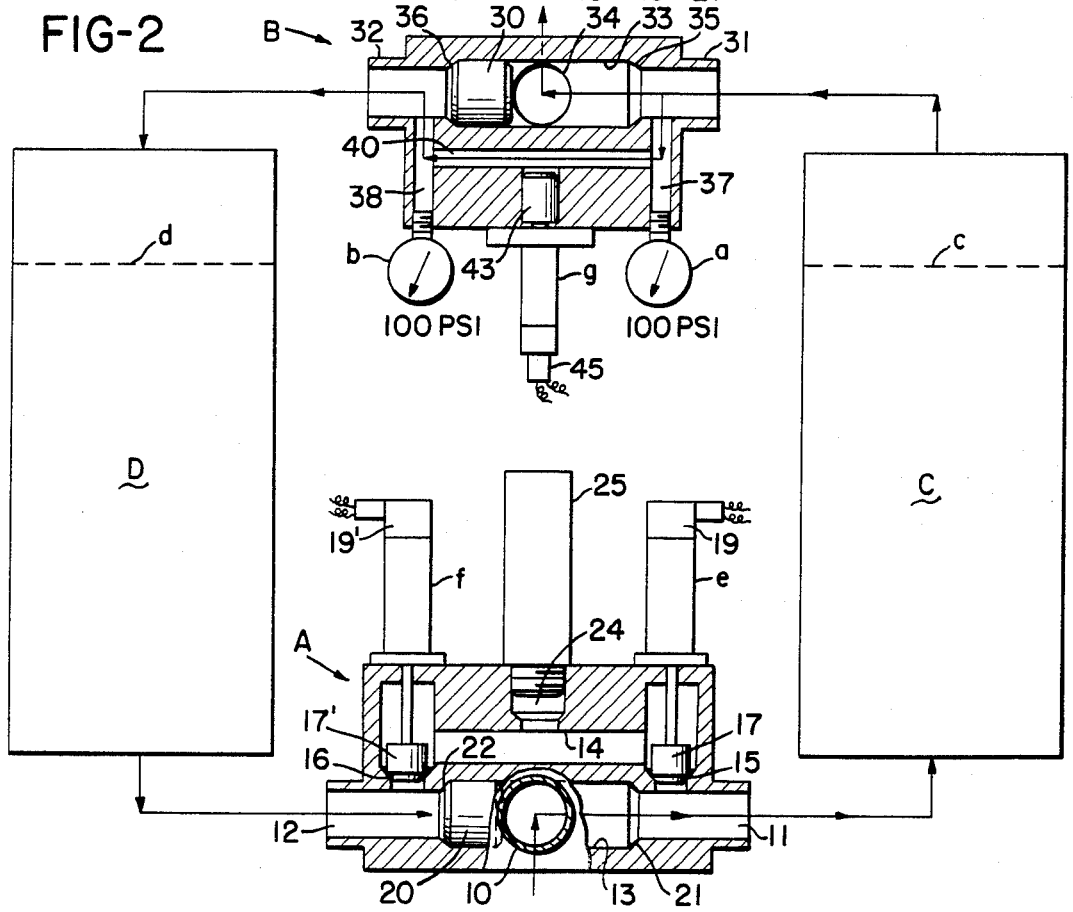

FIG. 2 shows an equalizing of pressure from the standpoint of opposite legs of the system which may be effected before a reverse flow of the fluid is accomplished. It will be noted that the control valve means 43 operating in a cross bore 41 of the upper shuttle valve unit B has been moved to a fully open position with reference to the auxiliary or by-pass passageway 40. Also, at this time, two control valve elements 17 and 17', of the lower shuttle valve unit A are in a fully closed position with respect to valve seats 15 and 16 that are at opposite ends of auxiliary passageway 14, such that exhaust from muffler 25 to the atmosphere is shut-off. Further, at this time, pressure-sensitive slide valve 20 of the lower unit A has an equal pressure applied to its opposite ends. This is distinguished from the unequal pressure which is applied under the conditions of FIG. 1 which, of course, positively retains the slide valve in its left hand closed position in the main passageway, such that pressurized fluid input from main inlet 10 actively moves to the right through tank C. Since, in FIG. 2, full pressure applied by the fluid being introduced through inlet 10 is equally applied to opposite ends of the lower slide valve element 20. It will be retained in the position of FIG. 1 until an unequal pressure is applied thereto.

Figure 3:
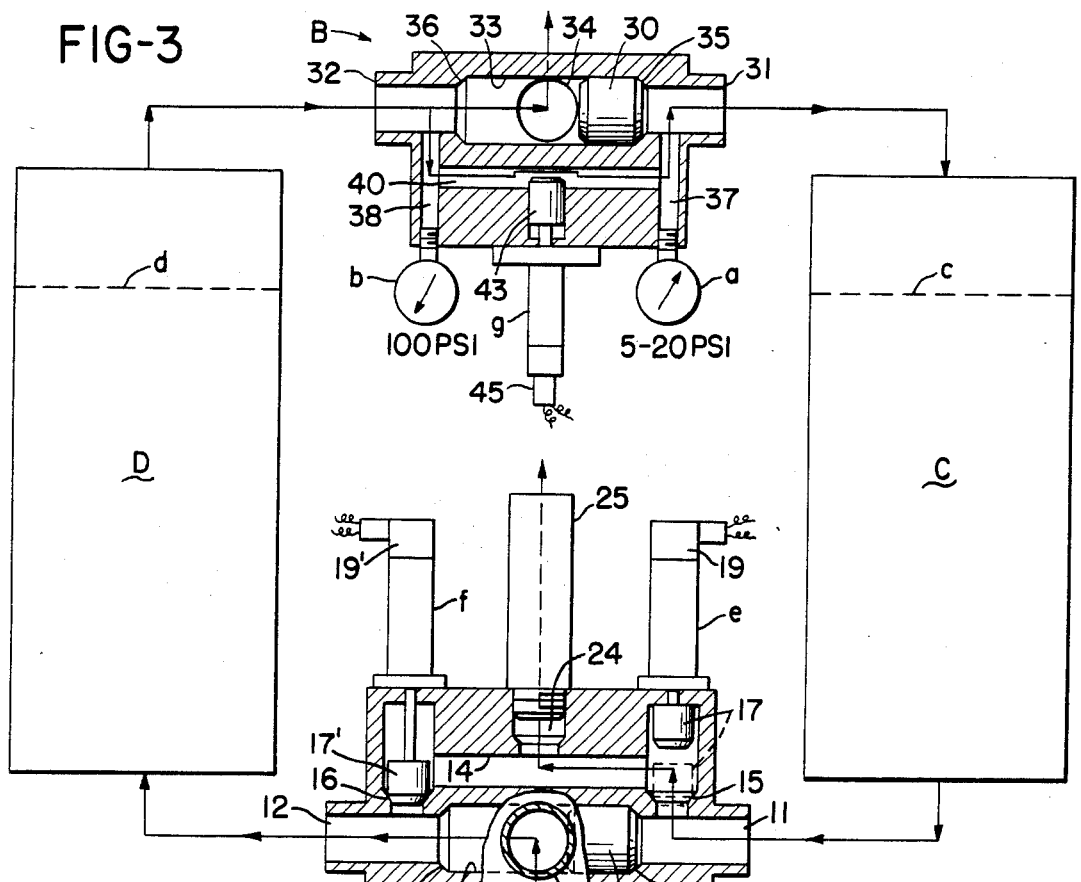

In FIG. 3, the cycle of operation has been reversed, since the right hand control valve 17 of the lower shuttle valve unit A has moved from its closed (dot and dash) position to an open position, thus opening the right end of the main passageway to the atmosphere, through the auxiliary passageway 14 and out through the muffler 25. At the same time, the slide valve element 30 of the upper shuttle valve unit B has moved from a closing-off position with respect to the left hand end of its main passageway 33 to a closing-off position with respect to its right hand valve seat 35. Its control valve 43 has been actuated by its control unit g to a partially closing-off or throttling position transversely of the auxiliary or by-pass passageway 40 to thus provide a pressure differential between its opposite ends. This, thus results in a full reverse flow shown by the arrows of FIG. 3.

Figure 4:
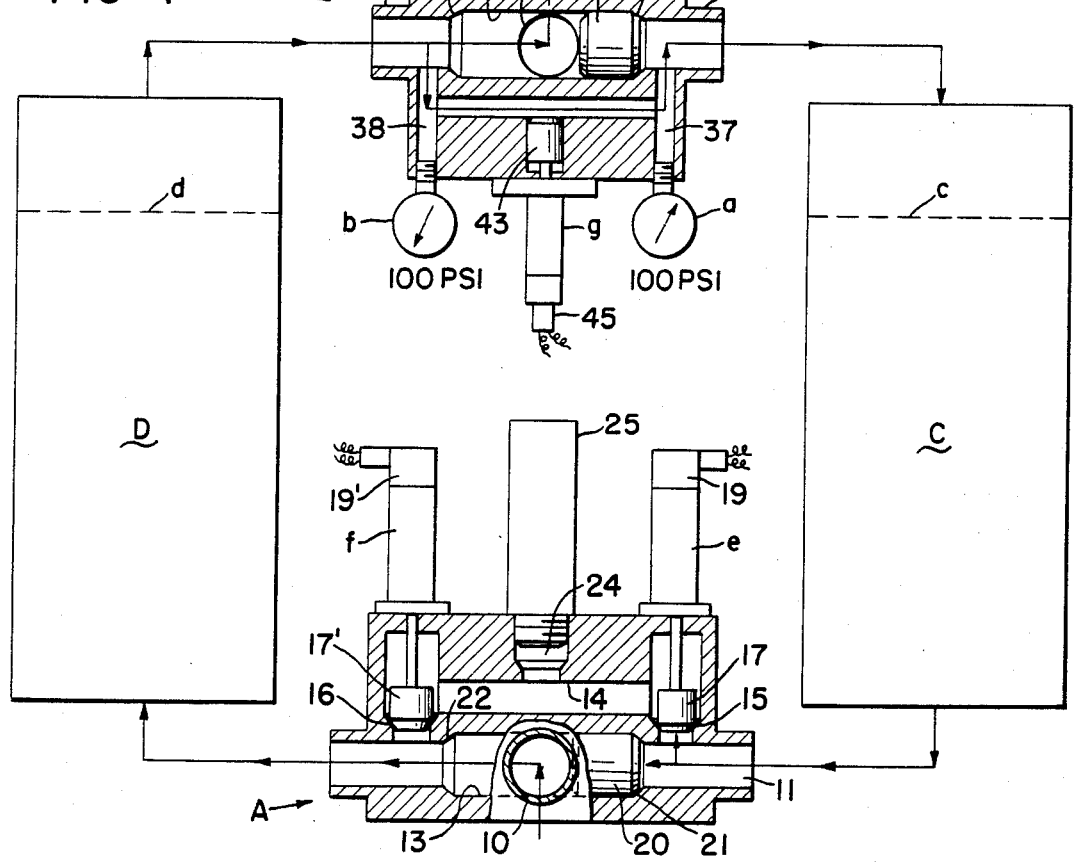

FIG. 4 represents a second equalization stage or cycle that follows the flow cycle of FIG. 3, and that is succeeded by a return to the original flow cycle of FIG. 1.

It will be appreciated by those skilled in the art that the valves 17, 17' and 43 may use any suitable conventional type of operating mechanism which includes a double-acting electrical solenoid arrangement, an electrical solenoid for one direction of operation and a spring for an opposite direction of operation, or fluid motor means, such as pneumatic means for operating them in one or both directions. It is further pointed out that the shuttle valve unit A and the shuttle valve B are, in themselves, believed to represent important improved structures in the art and to have other utilizations than herein shown for the purpose of illustration. The shuttle valve unit A, which in the operating system illustrated is the bottom valve, may be termed a primary pressure logic control valve, while the top shuttle valve unit B may be termed a self-actuating pressure logic secondary valve. The valve unit A is believed to be operatively new for outlet control, while valve unit B is believed to be basically new for enabling a reverse flow through the use of a by-pass passage whose flow is controlled.

The valve elements 17, 17', 20, 30 and 43 are as an optimum formed of a resin material such as polyethylene, while the seats in the housing of the units A and B are shaped to provide a sealing relation with cooperating sealing portions of the valve elements and, themselves, are preferably of metal material of the housing units.

We claim:

1. A system for automatically drying a gas such as air supplied under pressure thereto and for automatically rejuvenating desiccant used therein which comprises, a pair of drying tanks having desiccant material therein, a moist air input shuttle valve unit and a dry air output shuttle valve unit, each of said valve units having a main through-passageway therein, the main passageway of said input valve unit being connected at its opposite ends to one end of each tank, the main passageway of said output valve unit being connected at its opposite ends to the other ends of each tank, a moist pressurized air input port substantially centrally connected to the main passageway of said input valve unit, a dry air outlet connected substantially centrally to said main passageway of said output valve unit; said input valve unit having a by-pass passageway connected at its ends to opposite outer ends of the main passageway, secondary valve means adapted to open and close off opposite ends of said by-pass passageway with respect to the main passageway, an output discharge port open from said by-pass passageway; primary pressure-sensitive slide valve means for each of said valve units operatively positioned for closing-off opposite ends of the main passageway therein and adapted to shift from one end closing-off position to the other in accordance with difference in air pressure at opposite ends of the main passageway; said output valve unit having a by-pass passageway connected to opposite ends of its said main passageway and adapted to bleed-off a portion of dried air moving into its said main passageway and introduce it alternately in a purging reverse flow into each of said tanks, control valve means operatively carried by said output valve unit and positioned to automatically selectively control the pressure and amount of air flow through its said by-pass passageway, said secondary valve means of said input valve unit being adapted to alternatively open and close-off opposite ends of its said by-pass passageway when its said pressure-sensitive valve means is shifted within said main passageway to alternately close-off flow from said air input port to one of said pair of tanks and to open return flow from the other of said pair of tanks into said by-pass passageway for receiving purging air from the other tank for discharging it from said output discharge port, and said control valve means of said output valve unit being adapted to automatically decrease and then increase the pressure of air flow between opposite ends of its said by-pass passageway.

2. A system as defined in claim 1 wherein, said control valve means has automatically operated slide valve means for movement between fully open and partially open positions with respect to said by-pass passageway of said output valve unit to vary air pressure between opposite ends of its said main passageway, and automatic means to move said primary pressure-sensitive slide valve means of said input and output valves units between closing-off positions at opposite ends of their respective main passageways to thereby reverse the direction of flow of air being dried and of purging air through said pair of tanks.

3. A system as defined in claim 1 wherein said secondary valve means is a pair of slide valves for closing-off and opening opposite ends of said by-pass passageway of said input valve unit and cooperating with said primary pressure-sensitive slide valve means of said input valve unit to receive purging air alternately from each tank and discharge it through said output discharge port.

4. A unitary shuttle valve unit for controlling flow of fluid under pressure from an outside source to simultaneously direct flow therefrom and return flow thereto in alternately reversed sequential paths which comprises, a valve housing having a longitudinally extending main passageway thereacross with ports at its opposite ends, an inlet side port open substantially centrally to said main passageway, a pair of valve seats adjacent opposite ends of said main passageway, a pressure-sensitive slide valve for alternate closing-off and opening sliding movement between and with respect to said valve seats in accordance with a differential of fluid pressure applied at opposite ends of said main passageway, a longitudinally extending by-pass passageway connected at its opposite ends to opposite ends of said main passageway outwardly of each of said valve seats, and said by-pass passageway having valve means for controlling flow of fluid therein.

5. A shuttle valve unit as defined in claim 4 wherein, said pressure-sensitive valve has means cooperating therewith for reversing fluid flow between said ends and said side port, and said means comprises, an exhaust port connected to said by-pass passageway and individual valve means for opening and closing off fluid flow between opposite ends of said main passageway and said port.

6. A shuttle valve unit as defined in claim 4 wherein said control valve means comprises a pair of slide valves operatively mounted in said by-pass passageway adjacent its opposite ends for back and forth movement across the ends of said by-pass passageway.

7. A shuttle valve unit as defined in claim 4 wherein, said by-pass passageway has valve seats at its opposite ends, a fluid outlet port is connected to said by-pass passageway, and said control valve means comprises a pair of slide valve elements cooperating with said end-positioned valve seats for alternatively closing-off and opening the ends of said by-pass passageway and opposite ends of said main passageway with respect to said outlet port.

8. A shuttle valve unit for controlling flow of fluid under pressure from an outside source to simultaneously direct flow therefrom and return flow thereto in alternately reversed sequential paths which comprises, a valve housing having a linear main passageway therethrough with ports at its opposite ends, a main inlet open substantially centrally to said main passageway for introducing input fluid under pressure thereto, a pair of valve seats adjacent opposite ends of said main passageway, a pressure-sensitive slide valve element for alternate closing-off and opening movement between and with respect to said valve seats in accordance with a differential of fluid pressure applied at opposite ends of said main passageway, a by-pass passageway connected at its opposite ends to opposite ends of said main passageway outwardly of each of said valve seats, said by-pass passageway having a pair of valve seats at its opposite ends, an exhaust port connected to said by-pass passageway, and a pair of slide control valves adapted to cooperate with the valve seats at opposite ends of said by-pass passageway for alternately opening and closing-off fluid flow from said main passageway thereto.

9. A shuttle valve unit as defined in claim 8 wherein said pair of control valves have means for automatically opening and closing them in accordance with the direction of fluid flow through the ports at opposite ends of said main passageway.

10. A shuttle valve unit as defined in claim 9 wherein said pressure-sensitive valve element is a slide valve operatively mounted within said housing for back and forth movement between said valve seats of the main passsageway for alternating fluid flow from said main inlet out through the ports at opposite ends of said main passageway, and said means for automatically opening and closing said pair of control valves comprises electrically-controlled solenoid-operating units.

11. An input shuttle valve unit for controlling the flow of moist air under pressure from it through a desiccant for drying it and for taking-off a portion of the dried air and using it to purge a second desiccant which comprises, a valve housing having a main linear passageway therethrough that is centrally ported to provide a receiving inlet for moisturized air under pressure, a pair of valve seats within said main passageway adjacent opposite ends thereof, a pressure-sensitive slide valve element for closing-off and opening movement between and with respect to said valve seats in accordance with different air pressures applied at opposite ends of said main passageway, a linear by-pass passageway connected to said main passageway outwardly beyond each of said valve seats and having a pair of valve seats at its opposite ends, an exhaust port connected to said by-pass passageway, and a pair of automatically controlled slide valves adapted to operate at opposite ends of said by-pass passageway cooperating with said pair of valve seats for alternatively closing-off and opening ends thereof to receive moist purging air being alternatively introduced into opposite ends of said main passageway and discharge it through said exhaust port.

12. An improved shuttle valve unit for controlling flow of pressurized fluid therethrough which comprises, a housing, an open-end main linear passageway extending along and through opposite ends of said housing, valve seats adjacent opposite ends of said housing, valve seats adjacent opposite ends of and within said main passageway, a pressure-sensitive slide valve operatively positioned in said main passageway for alternative linear sliding opening and closing movement along said passageway with respect to said valve seats, an outlet port extending substantially centrally from said main passageway for a main outflow of the fluid, a by-pass passageway connected to and between opposite ends of said main passageway outwardly of said valve seats, and control valve means operatively-slidably positioned in said housing and adapted to move automatically between fully open and partially closed positions with respect to said by-pass passageway for controlling a flow of by-passing fluid and pressure between the opposite ends of said main passageway.

13. An improved shuttle valve unit as defined in claim 12 wherein a pair of auxiliary passageways extend from opposite ends of said by-pass passageway and have pressure-indicating gauges operatively connected thereto for reading air pressure at opposite ends of said by-pass passageway.

14. An improved shuttle valve unit as defined in claim 12 wherein said control valve means has automatic operating means to control the flow of air through said by-pass passageway and thereby provide a pressure differential between opposite ends thereof.

15. An improved shuttle valve unit as defined in claim 12 wherein said control valve means is a slide valve operatively mounted in said housing for controlled linear movement substantially transversely with respect to said by-pass passageway to increase and decrease the pressure of fluid flow between opposite end portions thereof and thereby alternatively move said pressure-sensitive valve between closing-off positions with respect to each of the valve seats of said main passageway.

16. A method for automatically continuously drying a moisture-containing gas such as air supplied under pressure by alternate forward movement through a system having a pair of first and second tanks containing dessicant material which comprises, introducing and passing moisturized air forwardly under pressure through the first tank and out from one end thereof as dried air while bleeding-off a portion of the dried air and moving it under reduced pressure into and through the second tank in a counter-purging direction of flow therethrough, thereafter increasing the pressure of the air being bled-off into the second tank to substantially the full pressure of dried air leaving the first tank to substantially equalize pressure of air flow between the pair of tanks, and then shutting-off the flow of moisturized air into the tank first and introducing it into and passing it through the second tank and out from one end thereof as dried air while bleeding-off a portion of the dried air and moving it under reduced pressure into and through the first tank in a counter-purging direction of flow therethrough, thereafter increasing the pressure of air being bled-off into the first tank to substantially the full pressure of dried air leaving the second tank to substantially equalize air pressure between the two tanks, and then shutting-off the flow of moisturized air into the second tank and again introducing it into and passing it through the first tank and out from the one end thereof as dried air and repeating the defined operations.

17. A method as defined in claim 16 wherein, bled-off air moving in a counter-purging direction through one of the tanks is discharged to the atmosphere while it is being supplied under reduced pressure, and is retained in the system when the pressure of air between the pair of tanks is substantially equalized before initiating a reversal of flow of moisturized air therebetween.

* * * * *